United States Patent [19]
Whitford

[11] Patent Number: 4,669,038
[45] Date of Patent: May 26, 1987

[54] LOW POWER HIGH EFFICIENCY SWITCHING POWER SUPPLY

[75] Inventor: Rowland E. Whitford, Painesville, Ohio

[73] Assignee: The Babcock & Wilcox Company, New Orleans, La.

[21] Appl. No.: 765,404

[22] Filed: Aug. 13, 1985

[51] Int. Cl.⁴ .......................................... H02M 3/335
[52] U.S. Cl. ..................................... 363/25; 323/266; 323/226
[58] Field of Search .................................. 363/24–26, 363/89; 323/226, 266, 231

[56] References Cited
U.S. PATENT DOCUMENTS 4,025,862  5/1977  Gautheron ........................ 323/266 X
4,502,104  2/1985  Mitchell ............................. 363/89 X

FOREIGN PATENT DOCUMENTS 2162711  6/1973  Fed. Rep. of Germany ........ 363/89

Primary Examiner—Peter S. Wong
Attorney, Agent, or Firm—Vytas R. Matas; Robert J. Edwards

[57] ABSTRACT

A low power high efficiency switching power supply comprises a switching transducer having primary and secondary windings. The primary winding is supplied with a primary voltage over a series connected constant current source and Zener diode. The primary voltage is chopped by an FET which has a gate connected to an oscillator operating at relatively low frequency. The secondary windings of the transformer are connected to full-wave rectifiers which convert the A.C. signal produced by the chopping of the primary voltage, int a D.C. signal. Efficiency is maximized by using fast switching FET's and low flux densities in the transformer. The power supply is particularly useful in 4–20 mA current loops.

7 Claims, 1 Drawing Figure

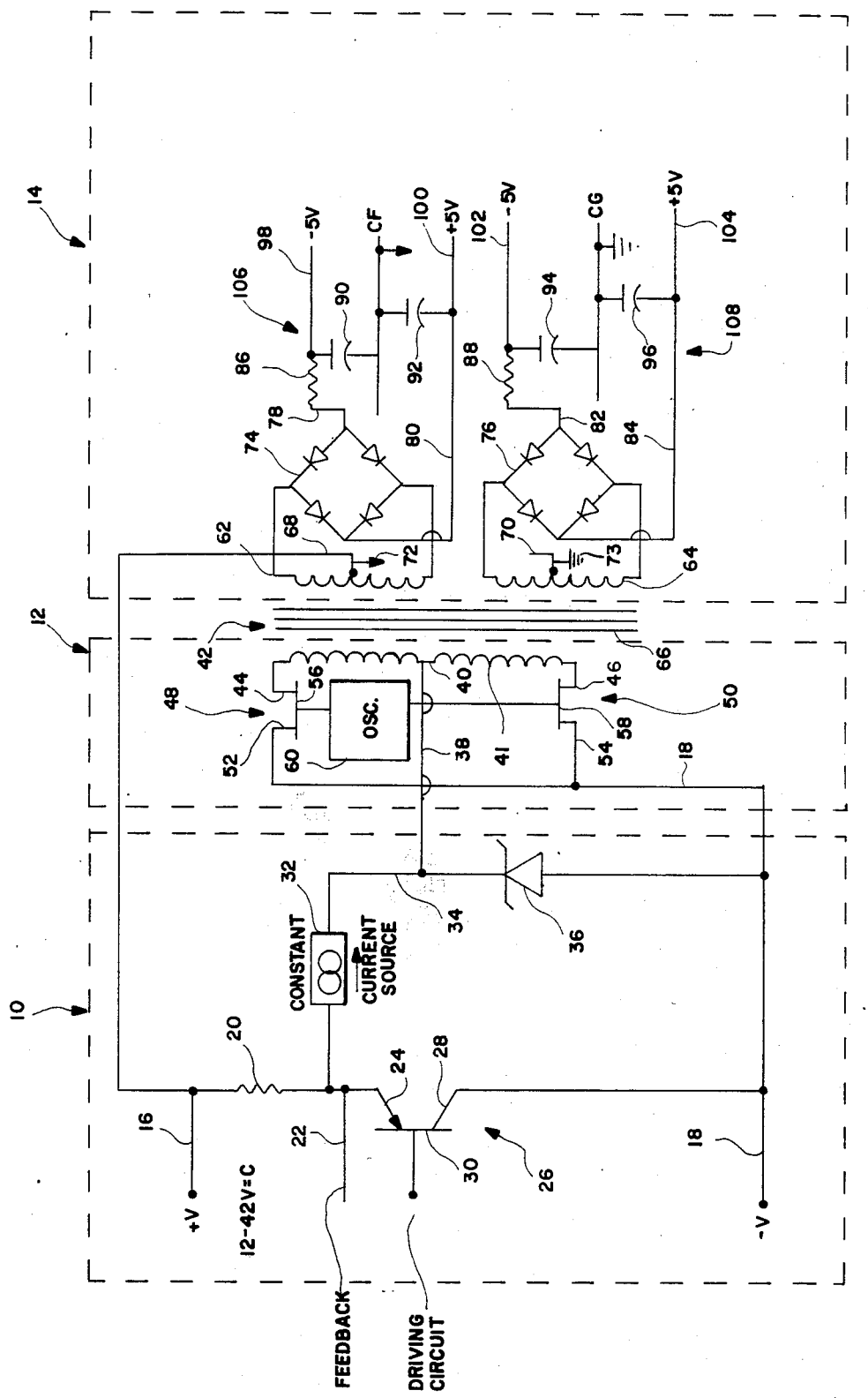

LOW POWER HIGH EFFICIENCY SWITCHING POWER SUPPLY

FIELD AND BACKGROUND OF THE INVENTION

The present invention relates in general to precision power supplies and in particular to a new and useful low power, high efficiency switching power supply which is particularly useful for powering a 4 to 20 mA current loop.

Normally, low power supply is of less than 50 mW, with split voltage sources (+ voltages) are accomplished by establishing a floating common (elevated) or by a low efficiency switching power supply. It is imperative however that a power supply operating from a 4–20 mA current loop be highly efficient to maximize circuit functions.

Two-wire analog transmission systems are well known. Such systems include a transmitter which is connected to a power supply by two wires which form a current loop. The transmitter includes, as at least one of its features, a transducer which senses a condition such as pressure or temperature. This condition is know as a process variable (PV).

A power supply is connected to the two wires to close the current loop. It is also conventional to provide a resistor in the current loop. The transmitter amplifies the signal from its transducer and this amplified signal is used to draw a certain current from the power supply which is proportional or otherwise related to the process variable. It is conventional to draw from a minimum of 4 (mA) to a maximum of 20 mA. The current between 4 and 20 mA passes through the resistor to produce a voltage drop across the resistor. This voltage drop can be measured to give a value for the process variable.

It is noted that the 4 mA minimum current is required to energize the circuitry of the transmitter. Any excess current above this 4 mA level is taken as a value which can be used to determine the process variable.

It is known that such 4–20 mA two-wire systems have an accuracy which is limited to around 0.1% at best. These systems are also essentially unidirectional with the transmitter being essentially uncontrolled and transmitting continuously.

SUMMARY OF THE INVENTION

The present invention is drawn to a power supply which can be utilized on a microcomputer based "smart" transmitter for 4–20 mA current loops.

According to the present invention, the power supply has improved efficiency over known power supplies for 4–20 mA current loops.

An object of the present invention thus is to provide a low power, high efficiency switching power supply which comprises a low loss switching transformer having a primary winding with at least two spaced apart connection points, and at least one secondary winding, plus and minus input lines for applying a primary voltage to said primary winding, a constant current source connected across the input lines, a Zener diode connected in series with said constant current source across the input lines, with one of the connection points of the primary winding being connected to one side of the zener diode which is connected to the constant current source, a FET having a source and a drain connected between the other connection point of the primary winding and one of the plus and minus input lines, a low power oscillator having an output connected to the base of the FET for chopping the primary voltage supplied to the primary winding, and a rectifier connected to the secondary winding for rectifying voltage from the secondary winding.

A further object of the present invention to to provide such a power supply wherein the rectifier is a full wave rectifier which has one pair of legs connected across the secondary winding and a second pair of legs connected to a filter circuit for further filtering voltage from the secondary winding.

A still further object of the invention is to provide two secondary windings and two FET's connected at opposite ends of the primary winding, one of the secondary windings having an intermediate terminal connected to ground and the other of the secondary windings having an intermediate terminal connected to another one of the plus and minus input lines for acting as a common floating reference.

A still further object of the invention is to provide a low power high efficiency switching power supply which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE in the drawing is a schematic diagram showing a circuit for the inventive power supply.

DESCRIPTION OF THE PREFERRED EMBODIMENT

Referring to the drawing in particular, the invention embodied therein comprises a circuit for a low power, high efficiency switching power supply which has been found to have an efficiency of 87 to 92%. This results in additional functions and increased operating speed (response time) for microprocessor based smart (the transmitter is monitored by a microprocessor while still on line) transmitters which are used with a 4–20 mA current loop system.

The circuit of the FIGURE includes an input circuit assembly 10 which receives a primary voltage of between 12 and 42 volts D.C. The input circuit assembly 10 may be connected to the current loop of a known 4–20 mA process control system. The function of the input circuit assembly 10 is to provide a constant current and voltage to an isolating circuit assembly 12.

The isolating circuit assembly 12 receives the constant voltage and current signal from the input circuit assembly 10 and electromagnetically couples this signal to an output circuit assembly 14. This provides electrical isolation between the input circuit assembly 10 and the output circuit assembly 14.

The output circuit assembly 14 consists of two ±5 v DC power supplies connected to two known RC filtering circuits that filter the ±5 v DC power outputs to establish an output signal that is filtered and isolated from the input circuit assembly 10.

The input circuit 10 receives the 12–42 volt D.C. signal from the proportional 4–20 mA process control loop on lines 16 and 18. A resistor 20 is connected in parallel to line 16 and a feedback line 22. An emitter 24 of a transistor 26 is connected in parallel to the feedback 22 and in series to the resistor 20. A collector 28 of transistor 26 is connected in parallel to line 18 and to a base 30 of the same transistor 26. The base 30 is connected to a driving circuit such as a microprocessor (not shown). A constant current source 32 is connected in parallel to resistor 20 and emitter 24 and in series to a Zener Diode 36 along a line 34. The Zener Diode 36 is then connected in parallel to input line 18.

The isolation circuit 12 is connected to the input circuit 10 along line 38 which is connected in parallel from line 34 to a center tap 40 of a primary winding 41 of a low loss switching transformer 42. Opposite ends of the primary winding 41 are connected to sources 44 and 46 of a pair of MOSFET's 48 and 50 respectively. Drains 52 and 54 of the respective MOSFET's 48 and 50 are connected into input line 18. Gates 56 and 58 of the respective MOSFET's 48 and 50 are connected to a low power oscillator 60.

A pair of secondary windings 62 and 64 are provided through a core 66 of transformer 42. A pair of center taps 68 and 70 are connected to reference voltage points 72,73 chosen by the user. Either side of the secondary windings 62 and 64 are connected to a pair of known Schottky diode bridge rectifier circuits 74 and 76 respectively. A pair of known RC networks 106 and 108 are connected to the rectifier circuits 74 and 76 by lines 78,80 and 82,84 respectively. A pair of resistors 86 and 88 form the known resistor-capacitor filtering networks 106 and 108 with capacitors 90,92 and 94,96 respectively. The output circuit 14 provides two pairs of output lines 98,100 and 102,104 that are connected in parallel to their respective filtering circuits 106 and 108 respectively.

In operation, input lines 16 and 18 of input circuit 10 are connected to a process control loop which provides a 4–20 mA signal proportional to a process variable. The input 4–20 mA current creates a voltage across the resistor 20. Since this current is proportional to the process variable the voltage created on resistor 20 is also proportional to the process variable and may be used to obtain a reading of the process variable. A known driving circuit (not shown) such as a microprocessor produces a signal which drives base 30 of the transistor 26. This allows current to flow through emitter 24 to collector 28 of transistor 26. This driving signal is also proportional to the process variable. As the base 30 of transistor 26 is being driven by the driving circuit a signal which is also proportional to the process variable flows back through feedback line 22.

The known constant current source 32, which is a group of transistors and resistors that provide a current of constant magnitude regardless of load in a known manner, supplies the isolating circuit 12 with a nonvarying current along lines 34 and 38. The Zener diode 36 regulates the voltage across isolating circuit 12 and prevents any AC power from circuit 12 from going back through lines 38 and 34 into line 18 and hence back into the 4–20 mA current loop.

The isolating circuit 12 receives the constant current from the constant current source 32 of the input circuit 10 along lines 34 and 38 at the center tap 40 of the switching transformer 42. The transformer 42 has a core 66 which is preferably toroid coil to reduce primary to secondary leakage losses by improving winding distribution. The transformer 42 is specially designed in that it operates at low flux densities (100–500 gauss) also to reduce core losses.

The low power oscillator 60 alternately puts a signal on gates 56 and 58 of respective MOSFET's 48 and 50. The signals turn on gates 56 and 58 alternately, allowing current to flow alternately from the center tap 40, through the primary coil 41, through the sources 44 and 46 to the respective drains 52 and 54 of the respective MOSFET's 48 and 50. The low power oscillator 60 in most previously designed power supplies of this type would alternately drive a pair of regular transistors instead of MOSFET's 48 and 50. By utilizing MOSFET's which have low power gate drive characteristics and fast switching characteristics instead of regular transistors, switching losses are greatly minimized. The oscillator should have a frequency of 10K Hz or less to further reduce overall switching losses in the MOSFET's, the transformers, etc.

This alternating current flowing through the primary coil 41 steps down to the two secondary windings 62 and 64 of the transformer 42. Each of the secondary windings 62 and 64 have center taps 68 and 70 respectively. These center taps are the common points for the two ±5 v supply outputs of output circuit 14.

Either end of both secondary windings 62 and 64 supply the input side of of known bridge rectifier circuits 74 and 76 respectively. Schottky diodes are used in bridges 74 and 76 to minimize switching losses. These known bridge rectifier circuits 74 and 76 change the ACV from the secondaries 62 and 64 to DCV in a known manner. The outputs of these bridge circuits 74 and 76 supply unfiltered DC volts to the output circuit 14.

The output circuit 14 has of two known RC filter networks 106 and 108 that filter the rough DCV from isolating circuit 12 into steady ±5 v DC sources. The output lines 98 and 102 supply a DC signal 5 v below the chosen reference points 72 and 73 respectively, and lines 100 and 104 supply a DC signal 5 v above the chosen reference points 72 and 73 respectively.

Thus it is seen that the present supply provides an output supply signal along lines 98,100 and 102,104 that is a low power and high efficiency supply with an efficiency of 87 to 92%. This results in increased response time for transmitters used in a 4–20 mA current loop.

While a specific embodiment of the invention has been shown and described in detail to illustrate the application of the principles of the invention, it will be understood that the invention may be embodied otherwise without departing from such principles.

What is claimed is:

1. A low power, high efficiency switching power supply comprising:
   a low loss switching transformer having a primary winding with at least two spaced apart connection points, and at least one secondary winding;
   plus and minus input lines for applying a primary voltage to said primary winding;
   a constant current source connected across said input lines;
   a Zener diode connected in series with said constant current source across said input lines providing a constant voltage source;
   one of said at least two connection points of said primary winding being connected to one side of said Zener diode;

a FET having a source and drain connected between the other of said connection points of said primary winding and one of said input lines;

a low loss oscillator having an output connected to a control gate of said FET for chopping the primary voltage supplied to said primary winding; and a full-wave rectifier connected across said secondary winding for rectifying A.C. voltage from said secondary winding into D.C. voltage.

2. A power supply according to claim 1, wherein said one connection point of said primary winding is connected to a side of said Zener diode which is connected to said constant current source.

3. A power supply according to claim 2, wherein said rectifier has a first pair of legs connected across said secondary winding and a second pair of legs, and a capacitive filter circuit connected across said second pair of legs.

4. A power supply according to claim 3, wherein said primary winding includes a further connection point on a side of said one connection point opposite from said other connection point, a second FET having a source and drain connected between said further connection point and said one of said input lines, said oscillator connected to a gate of said second FET, said transformer including a second secondary winding associated with a portion of said primary winding between said one and said further connection point, said first mentioned secondary winding being associated with a portion of said primary winding between said one and other connection points, and a second full-wave rectifier connected across said second secondary winding.

5. A power supply according to claim 4, wherein said second full-wave rectifier has a first pair of legs connected across said second secondary winding and a second pair of legs, with a capacitive filter circuit connected across said second pair of legs of said second rectifier.

6. A power supply according to claim 5, wherein said first secondary winding includes a center tap connected to ground, said first mentioned capacitive filter circuit comprising a pair of capacitors each having one end connected to one end of said second pair of legs of said first mentioned rectifier and an opposite end connected to said ground.

7. A power supply according to claim 6, wherein said second secondary winding includes a central tap connected to the other of said input lines, said second capacitive filter circuit comprising a pair of capacitors each having one end connected to one of said second pair of legs of said second rectifier and an opposite end connected to said other of said input lines.

* * * * *